United States Patent
Nagy (10) Patent No.: US 9,336,680 B2
(45) Date of Patent: *May 10, 2016

(54) METHOD FOR DETECTING A WHEEL OF A VEHICLE

(71) Applicant: Kapsch TrafficCom AG, Vienna (AT)

(72) Inventor: Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 359 days.

This patent is subject to a terminal disclaimer.

(21) Appl. No.: 13/933,418

(22) Filed: Jul. 2, 2013

(65) Prior Publication Data

US 2014/0009311 A1 Jan. 9, 2014

(30) Foreign Application Priority Data

Jul. 6, 2012 (EP) ..................................... 12175290
Dec. 14, 2012 (EP) ..................................... 12197148

(51) Int. Cl.
| | |
|---|---|
| *G08B 1/00* | (2006.01) |
| *G08G 1/056* | (2006.01) |
| *G01S 17/88* | (2006.01) |
| *G01S 7/41* | (2006.01) |
| *G01S 13/58* | (2006.01) |

(Continued)

(52) U.S. Cl.
CPC ............... *G08G 1/056* (2013.01); *G01S 7/415* (2013.01); *G01S 13/58* (2013.01); *G01S 13/91* (2013.01); *G01S 17/88* (2013.01); *G08G 1/04* (2013.01); *G07B 15/063* (2013.01)

(58) Field of Classification Search
CPC .............. G01S 1/00; G01C 1/00; G08G 1/01; H04W 4/00; G07C 5/008
USPC ............ 340/935, 933, 937, 928; 342/99, 153, 342/405, 418
See application file for complete search history.

(56) References Cited

U.S. PATENT DOCUMENTS

| | | |
|---|---|---|
| 5,392,034 A | 2/1995 | Kuwagaki |
| 5,717,390 A | 2/1998 | Hasselbring |

(Continued)

FOREIGN PATENT DOCUMENTS

EP 2390859 A1 11/2011

OTHER PUBLICATIONS

Extended European Search Report received for application No. 12175290.1, mailed on Oct. 17, 2012, 6 pages.

(Continued)

*Primary Examiner* — Daryl Pope
(74) *Attorney, Agent, or Firm* — Fiala & Weaver P.L.L.C.

(57) ABSTRACT

A rotating wheel of a vehicle is detected by evaluating the Doppler shift of a measuring beam emitted by a detector unit passed by the vehicle, reflected by the wheel and returned in Doppler-shifted form. In a relative position to the wheel, the vehicle comprises an onboard unit, which can establish a radio communication with a transceiver having a known location in the detector unit. The direction and distance of the onboard unit from the transceiver are measured on the basis of at least one radio communication between the same. The radiation direction or radiation position of the measuring beam is controlled in accordance with the measured direction and distance and taking into consideration the aforementioned relative position and location. The relative position is stored in the onboard unit and is read from the onboard unit by way of a radio communication for the purpose of the aforementioned consideration.

20 Claims, 5 Drawing Sheets

(51) Int. Cl.
*G01S 13/91* (2006.01)
*G08G 1/04* (2006.01)
*G07B 15/06* (2011.01)

(56) References Cited

U.S. PATENT DOCUMENTS

| | | | |
|---|---|---|---|
| 8,754,781 B2 | 6/2014 | Leopold et al. | |
| 2003/0102997 A1 | 6/2003 | Levin et al. | |
| 2010/0030540 A1* | 2/2010 | Choi | G06Q 40/08 703/8 |
| 2011/0080307 A1* | 4/2011 | Nagy | G06Q 30/0283 340/937 |
| 2012/0143786 A1 | 6/2012 | Karner | |
| 2013/0304322 A1* | 11/2013 | Isaji | B62D 6/00 701/41 |
| 2014/0009310 A1* | 1/2014 | Nagy | G08G 1/056 340/935 |
| 2014/0009312 A1* | 1/2014 | Nagy | G08G 1/052 340/936 |

OTHER PUBLICATIONS

Extended European Search Report received for application No. 12197148.5, mailed on May 7, 2013, 4 pages.

Non-final office action received for U.S. Appl. No. 13/929,446 dated Jan. 2, 2015, 4 pages.

\* cited by examiner

METHOD FOR DETECTING A WHEEL OF A VEHICLE

CROSS-REFERENCE TO RELATED APPLICATION(S)

This application claims priority to European Patent Application No. 12 175 290.1, filed on Jul. 6, 2012, and to European Patent Application No. 12 197 148.5, filed on Dec. 14, 2012, which are both incorporated by reference herein in their entireties.

BACKGROUND

1. Technical Field

The present application relates to a method and system for detecting a rotating wheel of a vehicle.

2. Background Art

Detecting vehicle wheels is of interest for numerous applications. For example, detecting wheels allows travel on a particular traffic area to be recognized with certainty, for example for border monitoring purposes or for triggering particular actions, such as triggering an alarm, activating lighting, opening a gate, recording a photo for monitoring purposes and the like. Modern traffic fee systems are also frequently directed to the number of axles of vehicles for fee assessment, so that the detection of wheels (wheel axles) can also constitute an important basis for imposing or checking road tolls, in particular also by way of mobile control vehicles, which are to check the number of axles of vehicles subject to tolls when passing them or in oncoming traffic.

It is known from DE 10 2008 037 233 A1 to detect wheels of a moving vehicle based on the different horizontal component of the tangential speed thereof as compared to the remaining vehicle, this tangential speed causing a corresponding Doppler frequency shift of a radar measuring beam. A radar speedometer is used for this purpose, which irradiates the lower region of passing vehicles by way of a radar lobe and time-averages a single speed measurement signal based on the received frequency spectrum that is returned, the signal exhibiting signal maxima at the locations of the wheels that are used for wheel detection.

The applicant of the present application disclosed novel and reliable methods for wheel detection that are particularly insusceptible to faults based on Doppler measurements in the not previously published patent applications EP 11 450 079.6, EP 11 450 080.4 and PCT/EP 2012/061645.

The applicant has recognized that the best possible alignment of the Doppler measuring beam with passing vehicles is desirable so as to further improve the detection reliability. On multi-lane roads, or roads with oncoming traffic, the distance at which a vehicle passes the detector unit frequently varies drastically, either due to driving style or the vehicle dimensions. This can result in insufficient illumination of the wheel to be detected by the measuring beam, causing detection errors.

BRIEF SUMMARY

It is an object of the present application to overcome the problems described above and to create a further improved method for wheel detection based on Doppler measurements.

This object is achieved by a method for detecting a rotating wheel of a vehicle by evaluating the Doppler shift of a measuring beam, which is emitted by a detector unit passed by the vehicle, reflected by the wheel and returned in Doppler-shifted form, wherein, in a relative position to the wheel, the vehicle comprises an onboard unit, which can establish a radio communication with a transceiver having a known location in the detector unit, comprising:

measuring the direction and distance of the onboard unit from the transceiver on the basis of at least one radio communication between the same; and controlling the radiation direction or radiation position of the measuring beam in accordance with the measured direction and distance and taking into consideration the relative position and location;

wherein the relative position is stored in the onboard unit and is read from the onboard unit by way of a radio communication for the purpose of the aforementioned consideration.

An aspect of the present patent application is based on using so-called onboard units (OBUs), which in road toll and communication systems are employed to impose tolls for the usage of locations by vehicles, for solving the problems described above. Onboard units of this type can establish radio communications of the dedicated short range communications (DSRC) type with roadside radio beacons (roadside entities, RSEs) having known positions along the way, whereby they can be located in each case by the radio coverage range of the radio beacon if the DSRC radio communication is successful. Examples of such beacon-based, infrastructure-bound road toll systems include road toll systems according to the CEN (European Committee for Standardization) or UNI-DSRC, ITS-G5 (Intelligent Transport Systems), IEEE-WAVE (Wireless Access in Vehicular Environments) (IEEE 802.11g) and RFID (radio frequency identification) standards. However, it is also possible for onboard units of satellite-based "beaconless" road toll systems, in which the onboard units are autonomously self-locating in a global navigation satellite system (GNSS) and transmit the location data thereof, or toll data generated therefrom, to a back office, for example by way of a mobile communication network, to be additionally equipped with DSRC radio modules, either for control readout purposes or as so-called "hybrid OBUs", which can cooperate both with GNSS and DSRC road toll systems.

The method employs the radio communication capability of the onboard units so as to determine the geometric relationships with respect to the detector unit, and based thereon the passing distance, based on radio communication when the Doppler detector unit is passed, and utilize this determination, in turn, to align the Doppler measuring beam of the detector unit. As a result, individual, adaptive and precise alignment of the measuring beam with the wheels of a passing vehicle can be achieved, whereby all types of Doppler evaluation methods for wheel detection can be carried out with high accuracy and precision, even with varying vehicle distances.

So as relate the direction and distance, which are measured based on the radio communication between the transceiver of the detector unit and the onboard unit of the vehicle, as precisely as possible to the direction and distance of the measuring beam between the detector unit and the wheels of the vehicle, it is desirable to have as precise knowledge as possible of the relative position of the onboard unit on the vehicle with respect to the wheels of the vehicles. However, this relative position may vary drastically, depending on the installation situation of the onboard unit on the vehicle. According to one aspect, the relative position is stored in the onboard unit - either directly in numerical form or in the form of an abstracted class description - and is read out in the course of radio communication and can thus be taken into consideration in the method as a reference value.

The user can either acquire an onboard unit that is intended for his specific vehicle type (vehicle class), with a particular relative position, which at the same time constitutes mounting instructions for attaching the onboard unit in the vehicle, being already being stored in this unit, or the user attaches the onboard unit initially in a particular relative position in the vehicle and subsequently saves the relative position to the onboard unit.

According to an embodiment, the aforementioned relative position is thus stored in the onboard unit by user input. This can be done either by way of a keyboard of the onboard unit, or with the aid of a data medium, in which the relative position is stored and which is read out by the onboard unit. The data medium can take on any arbitrary form, for example a chip card, SIM card, Smart card, magnetic strip card and the like, which is read out by way of electrical contacts or wirelessly, or a sticker comprising a one- or two-dimensional bar code, which is read out by an optical sensor of the onboard unit. The data medium may be attached on the onboard unit, for example in the form of a sticker, and read out by the onboard unit via a wireless connection. For example, the sticker can comprise a radio frequency identification (RFID) or near field communication (NFC) chip, which is read out by the onboard unit via radio.

As an alternative, the relative position can be saved to the onboard unit during production of the onboard unit—either in the factory or upon delivery to a user in a programming station.

Finally, it is also possible for this relative position to be measured by a stationary or mobile control device and saved to the onboard unit by way of a radio communication.

In each of these embodiments, the relative position can be stored in the onboard unit both in numerical form, for example as an installation transverse distance from the wheels and/or installation height above the wheels and/or installation longitudinal distance from the wheels, or it can be indicated in the form of a vehicle class, such as "CAR", "TRUCK", "BUS" or the like, for which customary installation positions, and consequently numerical values, of the relative positions are known from the prior art.

A particular embodiment is thus characterized in that the relative position is stored in the onboard unit in the form of a description of a vehicle class and that, for the purpose of the aforementioned consideration, the vehicle class description is read from the onboard unit and is translated into a relative position having numerical values by way of a database, which associates possible vehicle classes and numerical values of relative positions with each other. This considerably simplifies the input of the relative position in the onboard unit. For example, the user acquires an onboard unit for a particular vehicle class, or the user uses a keyboard or another input device to enter the class of the vehicle into the onboard unit.

In those embodiments in which the relative position is separately measured for each vehicle, the user does not need to adhere to any particular installation instructions or does not need to make any input. In one variant, the control device, which measures the relative position, can be one of the geographically distributed roadside radio beacons (RSEs) of a beacon-based toll system, for example, and this measurement of the relative position of the onboard unit on a vehicle can be carried out in specially equipped radio beacons of this toll systems. In the two last-mentioned variants, the relative position can be measured by creating a scan image of the vehicle using a scanner of the control device, by radio triangulation of the onboard unit using a transceiver of the control device, and by referencing the radio triangulation with the scan image.

The radio triangulation can take place in particular by way of phase measurements in an antenna array of the transceiver of the control device.

As an alternative, the relative position could also be measured optically, for example by creating a frontal image of the vehicle using a camera and optical recognition of the position of the onboard unit in the frontal image.

The measuring of the direction and distance between the onboard unit and the transceiver can take place by way of radio triangulation in the course of the radio communication between the same, in particular by way of phase measurements in an antenna array of the transceiver of the detector unit.

The method is suited for any type of measuring beam having a frequency that is subject to a Doppler effect-related frequency shift upon reflection from a moving target, such as a rotating wheel in this case. The measuring beam could be a laser or ultrasonic beam, for example. The measuring beam may be a radar beam, and the radiation direction thereof is controlled by phase control of an antenna array of the detector unit; as an alternative, the measuring beam could be a radar beam, and the radiation position thereof could be controlled by switching between several antennas of the detector unit.

The method is also suited for cooperation with any conceivable variant of wheel detection methods based on an evaluation of the Doppler shift of the measuring beam over a progression over time. Some variants are characterized in that a wheel is detected if the progression over time of the Doppler shift indicates a jump, a rise, a drop or a spread spectrum above a respective threshold value, and combinations of these variants are also conceivable.

The method is suited both for stationary and for mobile detector units. The detector unit may be configured as a control vehicle, so that the method can be employed, for example, so as to check vehicles in oncoming traffic, or vehicles on neighboring lanes in the same driving direction, and detect the wheels of the same.

The method is also suited for any type of radio communication that the aforementioned onboard units can carry out, for example also for mobile radio communication in terrestrial mobile communication networks. However, radio communication within the framework of beacon-supported road toll systems may be performed according to the UNI or CEN-DSRC, ITS-G5, IEEE-WAVE or RFID standards.

Further features and advantages, as well as the structure and operation of various embodiments, are described in detail below with reference to the accompanying drawings.

BRIEF DESCRIPTION OF THE DRAWINGS/FIGURES

Embodiments will be described in more detail hereafter with reference to the accompanying drawings. In the drawings.

Embodiments will now be described with reference to the accompanying drawings.

DETAILED DESCRIPTION

The present application relates to a method for detecting a rotating wheel of a vehicle by evaluating a Doppler shift of a measuring beam, which is emitted by a detector unit passed by the vehicle, reflected by the wheel and returned in Doppler-shifted form.

FIGS. 1a-1d, 2, and 3 show the principle of detecting a rotating wheel 1 of a vehicle 2, which is moving on a road 3, more precisely on a lane 3' thereof, in a driving direction 4. The wheel detection method is carried out by way of or in a detector unit 5, which in the example shown is mobile and configured as a control vehicle. The detector unit or the control vehicle 5 is moving on a second lane 3" of the road 3 in a driving direction 4', for example, which may be—but not necessarily—anti-parallel to the driving direction 4 of the vehicle 2 to be checked. Of course, the detector unit 5 could also be stationary, for example it could be set up at the roadside of the road 3 or lane 3'.

The detector unit 5 transmits a measuring beam 6, for example an ultrasonic, a LIDAR or a radar measuring beam, to the vehicle 2, or the wheels 1 thereof, upon passing so as to detect the wheels 1. It is apparent from the side views of FIGS. 1a to 1d that the measuring beam 6 can be directed at the wheel 1 from the front (FIG. 1a), obliquely from the front and above (FIG. 1b), from above (FIG. 1c) or any other direction of the drawing plane of FIG. 1 at an angle $\alpha$ relative to the vertical. It is apparent from FIG. 2a that the measuring beam 6, as seen looking in the driving direction 4, can be emitted by the detector unit 5 at differing angles $\beta$ relative to the horizontal, for example from a radiation position A at a predetermined height $h_s$ above the road 3, which is illustrated by four exemplary beam paths $R_1$, $R_2$, $R_3$ and $R_4$ of the measuring beam 6. It is apparent from FIG. 2b that the measuring beam 6 can also be emitted, for example, from radiation positions $A_1, A_2, A_3, A_4$ at various heights $h_{s1}, h_{s2}, h_{s3}, h_{s4}$, for example at identical angles $\beta$ relative to the horizontal. The top view of FIG. 3 shows that the measuring beam 6 can have differing angles $\gamma$ relative to the driving direction 4 (or 4'), for example directed obliquely forward from the detector unit 5.

The detector unit 5 is a Doppler detector and, as is known in the prior art, evaluates the received frequency of the measuring beam 6 that is reflected by the vehicle 2 or the wheels 1 thereof, wherein the Doppler effect-related frequency shift $\Delta f$ between the emitted and reflected measuring beams 6 can be used to determine the component $v_p$, as located (projected) in the direction of the measuring beam 6, of the relative speed v of the vehicle 2, or the tangential speed $v_t$ of the wheel 1, at the respective point P of the impingement region of the measuring beam 6. In the right halves of FIGS. 1a to 1d, the progression over time of this Doppler effect-related frequency shift, in short Doppler shift, $\Delta f$ is plotted against the time t.

Figure 1A:
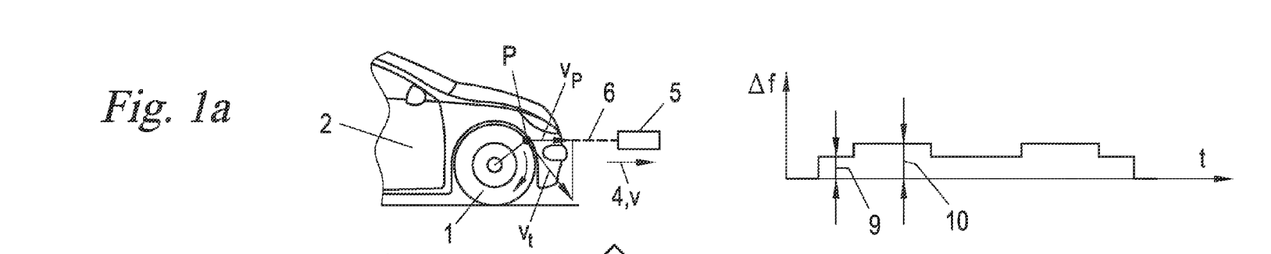
FIGS. 1a to 1d are exemplary idealized Doppler shift progressions over time at various angular positions of a Doppler measuring beam relative to a wheel, according to embodiments.
Figures 1B, 1C:
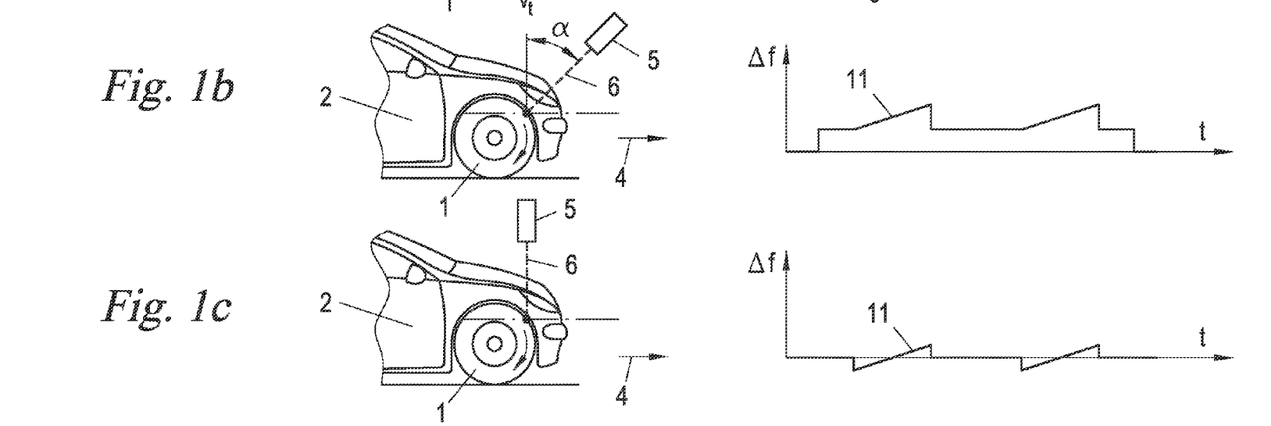

If the measuring beam 6 is emitted parallel to the plane of the road 3 ($\alpha=90°$, $\beta=0°$, $\gamma\neq90°$), the Doppler shift progression over time shown in FIG. 1a is obtained, showing a sudden increase 9 as soon as the measuring beam 6 impinges on the body of the vehicle 2 traveling at the speed v, and an additional jump 10 during passage of the wheel 1. If the measuring beam 6 impinges on the wheel 1 or vehicle 2 slightly obliquely from above ($0<\alpha<90°$, $0<\beta<90°$, $0<\gamma<180°$), the Doppler shift progression over time shown in FIG. 1b is obtained, showing an increase (or a drop, depending on the viewing and passage direction) 11 during passage of a wheel 1. A beam direction obliquely from above with $\alpha=0°$, $0<\beta\leq90°$ and $\gamma=90°$ results in the increases (or drops, depending on the viewing direction) shown in FIG. 1c, which have been adjusted for the speed v of the vehicle 2.

Figure 1D:
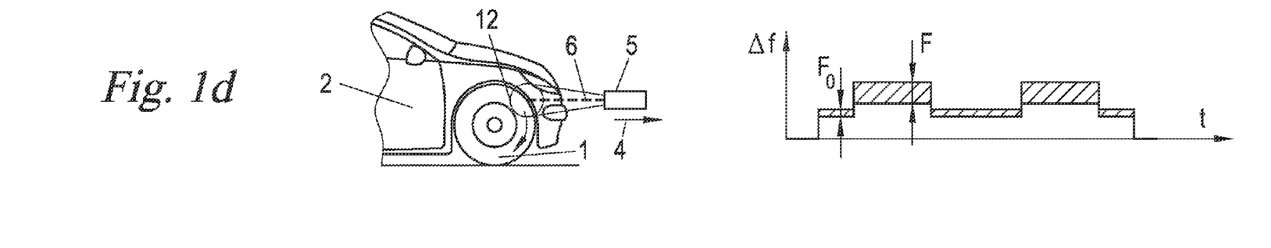

FIG. 1d shows that, in the case of a beam cross-section of the measuring beam 6 that is expanded in real terms and does not have the ideal-punctiform shape in the impingement region 12 of the measuring beam 6 onto the wheel 1 or the vehicle 2, always a superposition of the differing (tangential) speeds or projected speeds $v_p$ caused by differing points P in the impingement region 12 occurs, which during passage of a wheel 1 results in a received frequency mixture, which is to say a fragmentation or spread F of the Doppler shift progression over time, which is larger than the spectrum spread $F_0$ that occurs merely during passage of the body of the vehicle 2. Such a spread spectrum F can likewise be established as a criterion for the occurrence of a wheel 1.

The occurrence of a wheel 1 on a passing vehicle 2 can thus be detected, for example, by a sudden frequency change 10, an increase or a drop 11 and/or a spread spectrum F, each exceeding a predetermined threshold value.

The detector unit 5 can be of any type known from the prior art for the described Doppler evaluation and detection, either using a continuous, modulated or pulsed measuring beam 6. In the case of a continuous measuring beam 6, a Doppler frequency shift between the natural frequencies ("carrier frequencies") of the emitted and of the reflected measuring beam 6 can be determined by way of interference measurement, for example. In the case of a pulsed or modulated measuring beam, a Doppler shift between the pulse rates or modulation frequencies of the emitted and of the reflected measuring beam 6 can be measured. Such natural, carrier, pulse or modulation frequencies are understood to be included in the terms "emitted frequency" of the measuring beam 6 and "received frequency" of the reflected measuring beam 6 that are used here, which is to say the term 'received frequency' comprises any frequency of the measuring beam 6 that can be influenced by a Doppler effect.

Figure 2A:
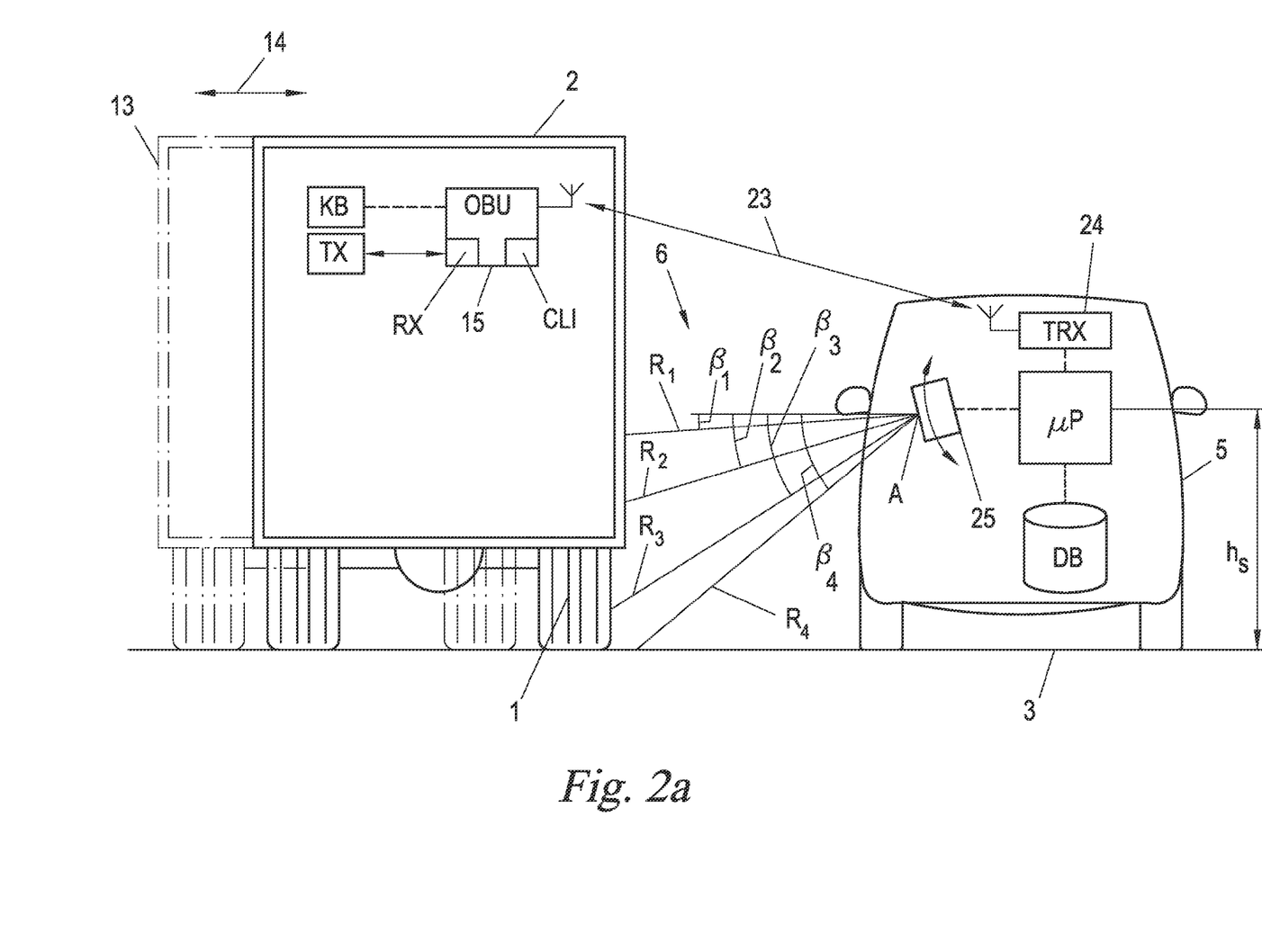
FIGS. 2a and 2b are two variants of the method based on exemplary beam paths between a control vehicle and a vehicle to be checked, as seen in the driving direction, according to example embodiments.
Figure 2B:
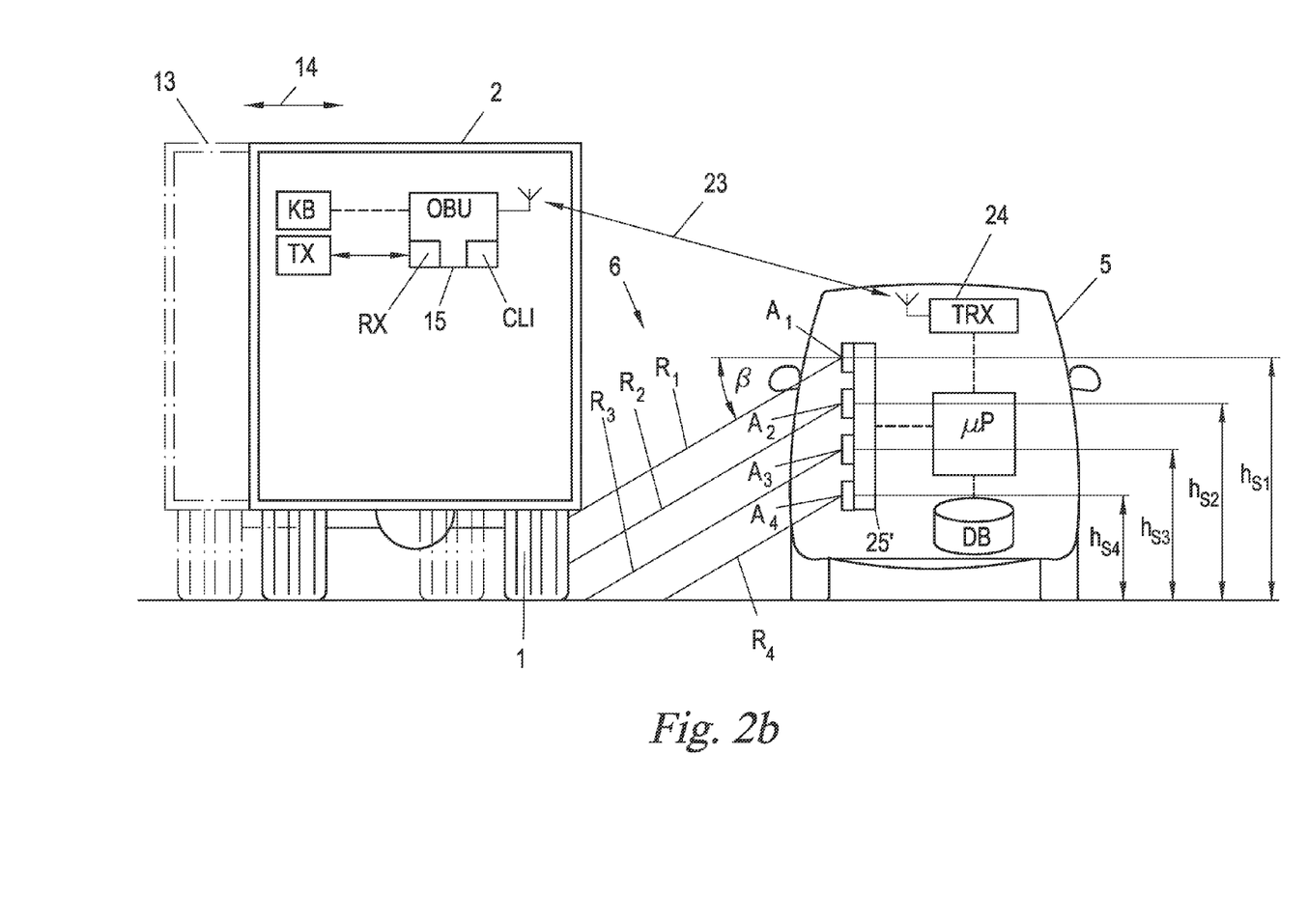
Figure 3:
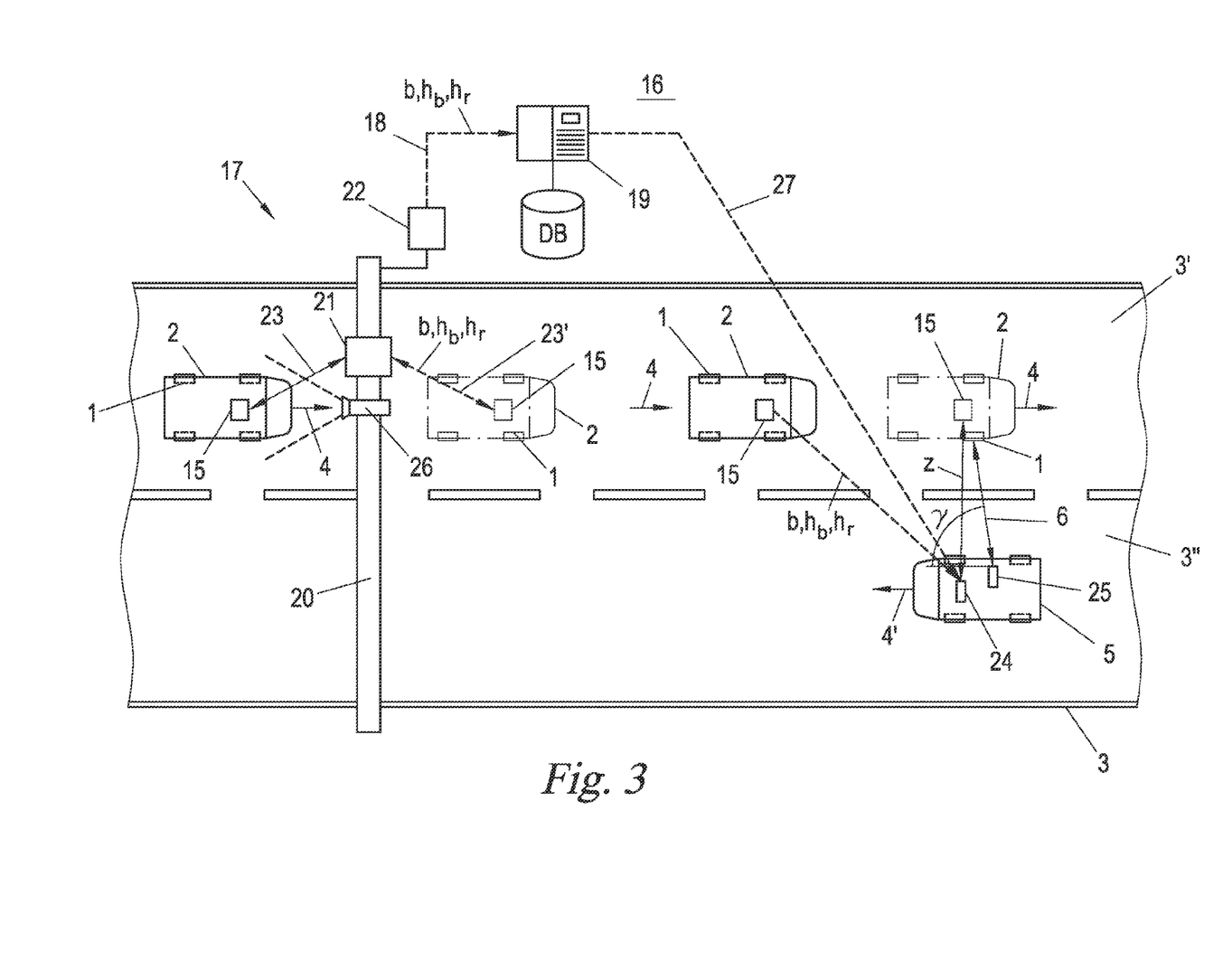
FIG. 3 shows various variants of the method based on a schematic top view onto a road section comprising a stationary control device, a detector unit configured as a control vehicle, and a vehicle to be checked in consecutive phases of the method, according to example embodiments.

Based on the exemplary paths $R_1$ to $R_4$ of the measuring beam 6, using differing radiation directions $\beta_1$ to $\beta_4$ (FIG. 2a) or differing radiation positions $A_1, A_2, A_3, A_4$ (FIG. 2b) and various lateral positions 13 of the vehicle 1 with respect to the detector unit 5 (arrow 14), FIGS. 2a and 2b show that there are radiation directions $\beta$ or radiation positions A for which the measuring beam 6 misses the vehicle 2 and/or the wheels 1 thereof. The method that is described hereafter is used to prevent this.

The method is based on the use of onboard units (OBUs) 15, which are carried by a respective vehicle 2, so as to allow the vehicle to participate in a road toll or communication system. Because the detection of wheels 1 of a vehicle 2 is frequently used as a basis for toll assessment, notably for road toll systems, the OBUs 15 can, at the same time, be used in such road toll systems for the purposes that are set out herein.

FIG. 3 shows sectional views of a road toll system 16, comprising a plurality of geographically distributed control devices 17 (only one being shown), which are set up along the road 3 at mutual distances from each other, for example. The control devices 17 are connected to a back office 19 of the road toll system 16 by way of data lines 18. The road toll system 16, and more particularly the control devices 17 thereof, impose tolls (charge fees) for the location usages by vehicles 2, for example the driving on the road 3.

For this purpose, the control devices 17 can be configured, for example, as radio beacons comprising a transceiver 21 that is arranged on a gantry 20 and a connected beacon processor 22 and they can carry out dedicated short range communication (DSRC) with the OBU 15 of a passing vehicle 2 by way of the transceiver 21. For example, the DSRC radio communication 23 can result in a toll transaction, which is reported to the back office 19 via the beacon processor 22 and the data connection 18 and/or is stored in the OBU 15.

The control devices (radio beacons) 17, the OBUs 15 and the internal transceivers thereof for carrying out the DSRC radio communication 23 can be composed according to all known DSRC standards, notably CEN or UNI-DSRC, ITS-G5 or IEEE WAVE (wireless access in vehicular environments), or also RFID (radio frequency identification). In the course of the passing of a radio beacon 17, each DSRC radio communication 23 can, for example, debit a current account in the back office 19 and/or the OBU 15 with a particular usage fee and then constitutes a "debit transaction"; however, the DSRC radio communication 23 can also form identification, maintenance, or software update transactions or the like within the framework of the road toll system 16.

The DSRC radio communication 23 can, in particular, also be used for wirelessly polling (reading out) data that is stored in the OBUs 15, such as master data, identification data, transaction data, recording data and the like. Such wireless polls 23 can originate not only from the stationary control devices or radio beacons 17, but also from "mobile" radio beacons 17 in the form of a detector unit 5 configured as a control vehicle. In other words, the detector unit 5 can also function as a radio beacon 17, and in addition, a radio beacon 17 can conversely function as a detector unit 5. Everything that is described with regard to the DSRC communication capability of the radio beacon 17 therefore also applies to the detector unit 5, which for this purpose is equipped with a dedicated transceiver 24, and vice versa.

Wireless polling of OBUs 15 via DSRC radio communication 23 can additionally be carried out in global navigation satellite (GNSS) road toll systems 16, in which, instead of a network of terrestrial radio beacons 17, the OBUs 15 in each case are autonomously self-locating by way of a GNSS receiver and transmit the locations thereof, or the toll transactions determined based thereon, to the back office 19, for example by way of the radio beacon network or a separate mobile communication network. Again, the OBUs 15 can be equipped with DSRC transceivers for wireless polling by radio beacons (control devices) 17 or control vehicles (detector units) 5. The method described here, and the detector unit 5 discussed here, are therefore suited for cooperating both with beacon-based and with satellite-based road toll systems 16.

A radio communication 23 between the transceiver 24 of the detector unit 5 and the internal transceiver (not shown) of the OBU 15 is thereafter used to determine the distance between the detector unit 5 and the vehicle 2 to be checked and to control, based thereon, the radiation direction β and/or radiation position A of the measuring beam 6 of the detector unit 5. A detector unit 5 is used for this purpose, the measuring beam 6 of which can also be controlled accordingly: if the detector unit 5 operates based on a Doppler radar, this can be done, for example, by mechanically pivoting or adjusting a directional antenna 25, by way of which the measuring beam 6 is emitted and received. Instead of a directional antenna 25, it is also possible to use an antenna array, the radiation direction of which can be adjusted by appropriate phase control, as is known from the prior art. As an alternative or in addition, the detector unit 5 could also comprise a group 25' of several antennas or antenna arrays, which are arranged mutually spaced from each other, for example at the heights $h_{s1}$ to $h_{s4}$ and can be switched so as to achieve differing radiation positions $A_1$ to $A_4$. The beam paths $R_1$ to $R_4$ from the various radiation positions $A_1$ to $A_4$ can also have differing angles β. In the case of a detector unit 5 that operates based on a Doppler LIDAR, the radiation direction β and/or the radiation position A of the measuring beam 6 could also be varied using an appropriate arrangement of deflection mirrors, as is known from the prior art. In the case of a detector unit 5 that is based on ultrasound Doppler evaluation, appropriate mechanically adjustable ultrasonic transducers or phase-controllable ultrasonic transducer arrays could be employed, or the like.

The method is further based on the use of transceivers 24 in the detector unit 5, which are able to measure the length of the communication link of a radio communication 23, which is to say the distance z between the transceiver 24 and the OBU 15, and the direction of the OBU 15 with respect to the transceiver 24. This is shown in detail in FIGS. 4a and 4b.

Figure 4A:
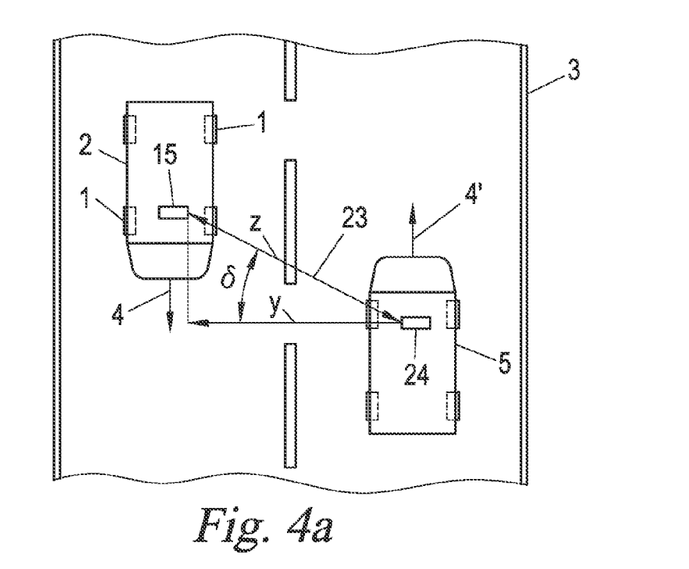
FIGS. 4a and 4b show the geometric fundamentals of the method based on a top view (FIG. 4a) and a front view in the driving direction (FIG. 4b) of the control vehicle and the vehicle in oncoming traffic to be checked, according to example embodiments.
Figure 4B:
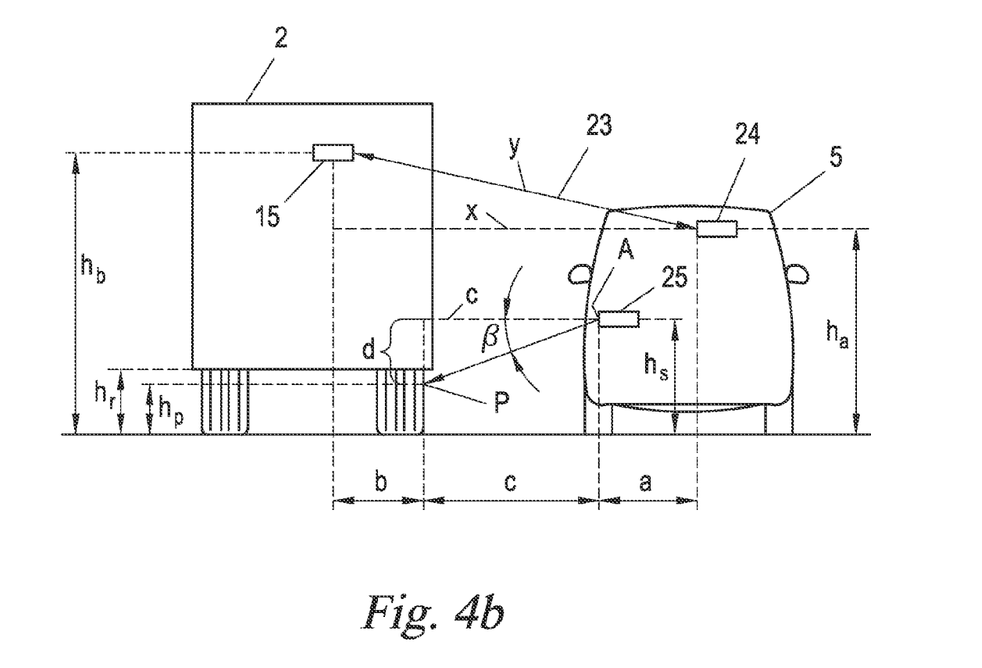

According to FIG. 4a, the "direction" of the OBU 15 of the vehicle 2 with respect to the transceiver 24 of the detector unit 5 denotes at least the angle δ parallel to the plane of the road 3 of the imaginary connecting line between the OBU 15 and the transceiver b 24, relative to a normal to the driving direction 4, or more precisely to the driving direction 4' of the detector unit 5.

In a first step of the method, the direction δ and distance z of the OBU 15 from the transceiver 24 are measured based on radio communication 23 that is carried out between the OBU 15 and transceiver 24. For this measurement, the transceiver 24 can comprise multiple antennas or an antenna array, for example, in which the received direction δ of a data packet that is transmitted by the OBU 15 and received by the transceiver 24 over the course of the radio communication 23 can be determined by way of propagation time and/or phase measurements. For example, the distance z can be determined from signal propagation time measurements, or even by transmitting GNSS position measurements of the OBU 15 provided by the OBU to the transceiver 24, which compares the information to its own GNSS position measurements.

So as to determine the passing distance between the vehicle 2 and the detector unit 5, and in particular the location of the wheels 1 relative to the radiation position A of the measuring beam 6, based on the distance z and the direction δ, having knowledge of both the installation location of the OBU 15 on the vehicle 2 and the location of the transceiver 24 with respect to the radiation position A of the detector unit 5 is required.

The installation location of the OBU 15 on the vehicle 2 is only of interest with regard to the relative position R of the OBU 15 with respect to the wheels 1, and in particular with regard to the lateral distance b of the OBU 15 from the outside of the wheel 1 and the installation height $h_b$ of the OBU 15 above the road 3 in relation to the height $h_r$ of the wheel 1 above the road 3; the installation location of the OBU 15 in the driving direction 4 on the vehicle 2 is not necessarily required here.

On the side of the detector unit 5, the location L of the transceiver 24 with respect to the radiation position A of the measuring beam 6 can be computed based on the lateral distance a of the transceiver 24 from the radiation position A and based on the difference $h_a - h_s$ between the installation height $h_a$ of the transceiver 24 and the installation height $h_s$ of the radiation position A above the road 3.

The location L or (a, $h_a$–$h_s$) of the transceiver 24 in the detector unit 5 is always known. The relative position R or (b, $h_b$–$h_r$) of the OBU 15 on the vehicle 2 can vary depending on the installation location, for example if the user himself attaches the OBU 15 in differing positions on the inside of the windshield. According to a first variant of the method, the relative position R of the OBU 15 on the vehicle 2 is predetermined for the user, which is to say he must attach the OBU 15 in a predetermined relative position in accordance with the type or class of his vehicle 2. The relative position R can then be regarded as known; for example, it can be obtained from vehicle-specific tables.

Such a vehicle-specific table, which includes an association between possible types or classes CL of vehicles 2 and the known relative positions R thereof, can be composed, for example, as in the following Table 1:

TABLE 1

| CL | R (b/$h_b$ – $h_r$) |
|---|---|
| "Car" | (0.8 m/0.6 m) |
| "VAN" | (1.0 m/1.0 m) |
| "Truck" | (1.2 m/1.3 m) |
| "BUS" | (1.2 m/1.4 m) |
| "BUS-Pos1" | (1.2 m/1.4 m) |
| "BUS-Pos2" | (1.3 m/1.6 m) |

It is also possible to define respective dedicated vehicle classes CL for various installation positions of an OBU 15 in one and the same vehicle 2, for example on the top center of the windshield ("Position 1") or in the lower right-hand corner of the windshield ("Position 2") and to store these as a vehicle class description CLI in the OBU 15, as is shown based on the exemplary vehicle classes CL="BUS-Pos1" (for "Position 1") and CL="BUS-Pos2" (for "Position 2") in Table 1.

For example, Table 1 can be stored in a database DB of the control device 17 and/or of the back office 19 and/or of the control vehicle 5. A description CLI ("class indication") about the class CL of the vehicle 2 can then be stored in the OBU 15—basically as a "rough" description of the relative position R.

For example, the class description CLI can be saved during production of the OBU 15, either in the factory or upon delivery to a user, in a programming station for the user-specific programming (customization) of the OBU 15. The user can be offered three classes CL for selection, for example, from which he chooses one that is then programmed in the course of the OBU customization. The OBU 15 thus prepared is then intended to be attached in a vehicle 2 of the respective stored (programmed) vehicle class CL. The user then acquires, for example, an OBU 15 that is manufactured or programmed for the vehicle class CL="BUS", according to the installation instructions of which the same is to be attached at a lateral distance b=1.2 m from the wheels and at a height $h_b$–$h_r$=1.4 m above the right wheel on the windshield, for example.

As an alternative, the user can also personally save the vehicle class description CLI to the OBU 15, for example by way of user input using a keyboard KB of the OBU 15. For example, this keyboard can comprise various buttons for the respective usage purpose of the OBU 15, for example a button labeled "CAR" for setting or saving the vehicle classes CL="CAR" in the OBU 15; a button labeled "TRUCK" for setting the vehicle classes CL="TRUCK", and the like.

Another option is to enter the vehicle class description CLI into the OBU 15 by way of a data medium TX (FIGS. 2a, 2b). For example, the data medium TX can be a chip card, SIM card, magnetic strip card, or the like, which is inserted into a read device RX of the OBU 15, for example, and is inductively or capacitively connected by way of electrical contacts, whereupon the OBU 15 reads the class description CLI from the data medium TX. However, the data medium TX could also be an optical data medium, for example a piece of paper or a sticker comprising a one- or two-dimensional bar code or another optical marking, which is read by an optical sensor RX of the OBU 15. As an alternative, the data medium TX is a radio chip, for example a transponder according to the near field communication (NFC) or radio frequency identification (RFID) standard, and the read device RX of the OBU 15 is an NFC or RFID read device, so as to read the class description CLI from the data medium TX via short range communication. Such a radio chip, for example an RFID or NFC chip, could be accommodated in a sticker, for example, which the user attaches to the OBU 15 or which is attached to the OBU 15 during customization of the OBU 15 in the factory or upon delivery.

Instead of a description of the relative position R that is "simplified" or configured for such vehicle classes CL, it is also possible, of course, to store the numerical value of the relative position R directly to the OBU 15, for example in the form (1.2 m/1.3 m) in the case of a vehicle 2 of the "TRUCK" type, and more particularly both during production and later by the user himself The exact numerical values of the relative position R could also be measured during production, or later during operation by the user, and stored to the OBU 15, for example by way of the keyboard KB of the OBU 15 or the data medium TX.

The relative position R stored in the OBU 15 can thereafter be read from the OBU 15 in the course of a radio communication 23, either directly in form of the numerical values b, or $h_b$–$h_r$, or in form of the class description CLI. A class description CLI that is read from the OBU 15 can be "translated back" into the numerical form (b/$h_b$–$h_r$) using Table 1 of the database DB. In contrast, if the relative position R is stored directly in numerical form in the OBU 15, the database DB can be eliminated.

The numerical values of the relative position R can, of course, also only be a single dimension, for example the lateral distance b or the installation height $h_b$–$h_r$ above the wheel, or an entire 3-tuple comprising the transverse distance b, the installation height $h_b$–$h_r$, and the installation location of the OBU 15 in the driving direction 4 on the vehicle 2.

In a further embodiment, the relative position R of the OBU 15 on the vehicle 2 is measured, and the measurement result is stored either in the OBU 15 itself or in a database in the road toll system 16, for example one of the radio beacons 17, a proxy processor of the road toll system or the back office 19, either in the precise form (b/$h_b$–$h_r$) or "simplified" as a class description CLI. This measuring process can be carried out by the control device or radio beacon 17, for example, which is schematically indicated in FIG. 3. The radio beacon 17 can comprise a scanner 26 for this purpose, for example a laser scanner, which geometrically scans the vehicle 2 during passage; at the same time, using radio triangulation, for example by way of phase measurements on multiple antennas or in an antenna array, the transceiver 21 of the radio beacon 17 can measure the relative position R, referencing the radio triangulation with the scan image of the scanner 26. Instead of a scanner 26, a camera could be used, for example, which creates a frontal image of the passing vehicle 2, in which again the relative position R of the OBU 15 is referenced by radio triangulation by way of the transceiver 21, or with an OBU 15 that is attached in particular to the inside of the windshield being detected in the frontal image by optical recognition of the relative position R.

The relative position R thus measured by a control device 17 connected upstream of the detector unit 5 can then be stored in the OBU 15 by the transceiver 21, for example by way of radio communication 23, or can be stored in a database of the road toll system 16, for example in the radio beacon 17 or, via the data path 18, in the back office 19.

In the further course of the method, if these values are required by the detector unit 5 for controlling the measuring beam 6, the relative position R can either be received from the OBU 15 via a radio communication 23 or can be requested for a particular OBU 15 via a radio data channel 27 from the database of the radio beacon 17 or the back office 19, where the appropriate information is looked up. It is also possible to provide a separate intermediate storage unit or proxy processor in the road toll system 16 for this purpose, which is able to provide the required data to the detector unit 5 especially quickly; the intermediate storage unit can be stationary or mobile and retrieve data from the aforementioned database on a regular basis, for example once a day, so as to make this available to the detector unit 5.

If the relative position R, which is read from the OBU 15 via the radio communication 23, is stored there in form of a vehicle class description CLI, the same is translated, as described above, with the aid of Table 1 of the database DB into the desired numerical values, for example the 2-tuple $(b/h_b-h_r)$, before being used for additional computations.

Having knowledge of the location L $(a, h_a-h_s)$ and of the relative position R $(b, h_b-h_r)$, it is then possible, using geometric calculations, to compute the radiation direction, in particular the angle β thereof, and/or the radiation position A, in particular the height $h_s$ thereof, for the measuring beam 6 of the detector unit 5, for example in the manner described below.

Based on the distance z and direction δ, the distance y that is projected normal to the driving direction 4 follows from $$y = z \cos \delta \qquad (1)$$

and the distance x, which is projected parallel to the road 3 or horizontal, between the OBU 15 and the transceiver 24 follows from $$x = \sqrt{y^2 - (h_b - h_a)^2} \qquad (2)$$

Having knowledge of the transverse distances a, b from the received relative position R and the known location L, the transverse distance c between the radiation position A and the wheel 1 follows from $$c = x - b - a \qquad (3)$$

The vertical distance between the radiation position A at the height $h_s$ and an impingement point P on the wheel 1, which is located at a height F, in percentage terms, of the wheel height $h_r$, for example F=70%, is $$d = h_s - F \cdot h_r \qquad (4)$$

The desired radiation direction β, specifically for the embodiment of FIG. 2a having a variable radiation direction β, thus follows from $$\beta = \arctan \frac{d}{c} \qquad (5)$$

As an alternative, the desired radiation position A at a desired radiation height $h_s$, specifically for the embodiment of FIG. 2b having variably high radiation positions $A_1$ to $A_4$, follows from $$h_s = F \cdot h_r + c \cdot \tan \beta \qquad (6)$$

The radiation direction—which in the example shown is represented in a simplified manner by the angle β, although generally one or more of the angles α, β, γ can be covered—and the radiation position A—which in the example shown is represented in simplified form by the height $h_s$, generally the radiation position A can also be established in both remaining spatial directions—can thus be computed by measuring the direction γ and the distance z between the onboard unit 15 and the transceiver 24.

Of course, the detector unit 5 can be implemented both in the shown mobile form as a control vehicle, and in stationary form, for example using existing radio infrastructure, such as WAVE or DSRC radio beacons of a road toll system or WLAN (wireless local area network) radio beacons or a roadside Internet infrastructure. This allows existing transceiver parts of WLAN, WAVE or DSRC radio beacons, for example, to be used as the transceiver part of a Doppler detector unit 5. The method can thus be implemented, for example, as a software application that runs on a conventional mobile or stationary WLAN, WAVE or DSRC control device or radio beacon.

Previously, it was assumed that the emitted frequency of the measuring beam 6 is constant, which is to say the progression over time thereof is a constant progression. However, it is also possible for the detector unit 5 to emit a measuring beam 6 having an emitted frequency progression that is not constant over time, for example in the case of frequency hopping methods, in which the frequency changes continually—according to a predetermined or known pattern. The plotted received frequency (mixture) progressions over time of FIGS. 1a to 1d are plotted relative to the previously known progression over time of the emitted frequency of the measuring beam 6—either in constant or changing form—which is to say referenced or standardized thereto, so that the effect of known emitted frequency progressions over time can be compensated for.

CONCLUSION

The invention is thus not limited to the shown embodiments, but encompasses all variants and modifications that are covered by the scope of the accompanying claims. While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the described embodiments should not be limited by any of the above-described exemplary embodiments, but should be defined only in accordance with the following claims and their equivalents.

What is claimed is:

1. A method for detecting a rotating wheel of a vehicle by evaluating the Doppler shift of a measuring beam, which is emitted by a detector unit passed by the vehicle, reflected by the wheel and returned in Doppler-shifted form, wherein, in a relative position to the wheel, the vehicle comprises an onboard unit, which can establish a radio communication with a transceiver having a known location in the detector unit, the method comprising:
measuring the direction and distance of the onboard unit from the transceiver on the basis of at least one radio communication between the onboard unit and the transceiver; and controlling the radiation direction or radiation position of the measuring beam in accordance with the measured direction and distance and taking into consideration the relative position and location;
wherein the relative position is stored in the onboard unit and is read from the onboard unit by way of a radio communication for the purpose of the consideration.

2. The method according to claim 1, wherein the relative position is stored to the onboard unit by user input.

3. The method according to claim 2, wherein the user input takes place by way of a keyboard of the onboard unit.

4. The method according to claim 2, wherein the user input takes place with the aid of a data medium, in which the relative position is stored and which is read out by the onboard unit.

5. The method according to claim 4, wherein the data medium is attached to the onboard unit and is read out by the onboard unit via a wireless connection, according to an RFID (radio frequency identification) or NFC (near field communication) standard.

6. The method according to claim 1, wherein the relative position is stored in the onboard unit during production of the same.

7. The method according to claim 1, wherein the relative position is measured by a stationary or mobile control device and saved to the onboard unit by way of a radio communication.

8. The method according to claim 1, wherein the relative position is stored in the onboard unit in the form of a description of a vehicle class, and that, for the consideration, the vehicle class description is read from the onboard unit and is translated into a relative position having numerical values with the aid of a database, which associates possible vehicle classes and numerical values of relative positions with each other.

9. The method according to claim 1, wherein the direction and distance of the onboard unit from the transceiver are measured by radio triangulation over a course of the radio communication between the onboard unit and the transceiver.

10. The method according to claim 9, wherein the radio triangulation takes place by way of phase measurements in an antenna array of the transceiver of the detector unit.

11. The method according to claim 1, wherein the measuring beam is a radar beam, and that the radiation direction thereof is controlled by phase control of an antenna array of the detector unit.

12. The method according to claim 1, wherein the measuring beam is a radar beam, and that the radiation position thereof is controlled by switching between a plurality of antennas of the detector unit.

13. The method according to claim 1, wherein a wheel is detected when a progression over time of the Doppler shift indicates a jump, an increase, a drop or a spread spectrum above a respective threshold value.

14. The method according to claim 1, wherein the detector unit is configured as a control vehicle.

15. The method according to claim 1, wherein the radio communication takes place according to the UNI or CEN-DSRC, ITS-G5, IEEE-WAVE or RFID standards.

16. A detector unit configured to detect a rotating wheel of a vehicle by evaluating the Doppler shift of a measuring beam emitted by the detector unit, reflected by the wheel, and returned in Doppler-shifted form, the detector unit comprising:
a transceiver configured to conduct at least one radio communication with an onboard unit of the vehicle in a relative position to the wheel to measure the direction and distance of the onboard unit from the transceiver, the transceiver having a known location in the detector unit; and
the detector unit is configured to control the radiation direction or radiation position of the measuring beam in accordance with the measured direction and distance and taking into consideration the relative position and location; and
wherein the relative position is read by the detector unit from the onboard unit by way of a radio communication.

17. The detector unit of claim 16, wherein detector unit is configured to measure the direction and distance of the onboard unit from the transceiver by radio triangulation over a course of the at least one radio communication between the onboard unit and the transceiver.

18. The detector unit of claim 16, wherein a wheel is detected when a progression over time of the Doppler shift indicates a jump, an increase, a drop or a spread spectrum above a respective threshold value.

19. An onboard unit on a vehicle in a relative position to a wheel of the vehicle, comprising:
a transceiver configured to conduct a radio communication with a transceiver of a detector unit passed by the vehicle, the transceiver of the onboard unit configured to conduct at least one radio communication with the transceiver of the detector unit to enable the detector unit to measure the direction and distance of the onboard unit from the transceiver of the detector unit; and
a data medium that stores the relative position and is read by the transceiver of the detector unit by way of a radio communication.

20. The onboard unit of claim 19, wherein the relative position is stored in the data medium in the form of a description of a vehicle class.

* * * * *